United States Patent
Pushnig et al.

[15] 3,650,342
[45] Mar. 21, 1972

[54] CONVERTIBLE SNOW TRACK-WHEELED SCOOTER TYPE VEHICLE

[72] Inventors: Godfrey Pushnig, 121 E. 226th Street, Euclid, Ohio 44123; Nicola Battistone, 16026 St. Clair Avenue, Cleveland, Ohio 44110

[22] Filed: Feb. 24, 1970

[21] Appl. No.: 13,586

[52] U.S. Cl. ............................180/5 R, 180/9.24, 180/33
[51] Int. Cl. ...................B62d 61/02, B62m 27/02
[58] Field of Search .................180/5 R, 9.24, 9.24 A, 29, 180/30, 33, 32; 280/278, 279

[56] References Cited

UNITED STATES PATENTS

| | | |
|---|---|---|
| 3,252,533 | 5/1966 | Aeder............................180/9.24 X |
| 3,439,763 | 4/1969 | Pederson........................180/9.24 |
| 3,077,238 | 2/1963 | Nelson...........................180/9.24 X |
| 3,483,937 | 12/1969 | Vann..............................180/33 X |

*Primary Examiner*—Richard J. Johnson
*Attorney*—Ely, Golrick & Flynn

[57] ABSTRACT

A motor scooter type vehicle convertible between two-wheeled and ski and snow-belt-driven functional forms and further transportable in relatively compact form. A light weight vehicle frame weldment includes left and right hand tubular trapezoids having inwardly bent top front corners embracing a steering fork mounting head tube, spacer bars between seat-supporting, straight parallel major portions of horizontal upper reaches, and an engine and transmission gear box support plate between lower parallel horizontal reaches. With a snow tracking endless belt assembly and a steering runner removably attached respectively to the frame bottom and to the axle of the front wheel in a steering fork detachably pivoted in the head tube, the belt chain driven from the engine through the gear box, a snow scooter type vehicle is available. A rear driving wheel, supported by a rearwardly extending fork pivoted at the rear bottom of the frame and by paired shock absorber struts between respective rear fork arms and selected points on the frame upper reach region, has a permanent drive chain connection to the gear box, so that upon runner and snow belt assembly removal and rear wheel shift, from an upwardly retracted inoperable location downwardly into a driving position, a wheeled motor scooter vehicle arises.

17 Claims, 7 Drawing Figures

Patented March 21, 1972

INVENTORS
NICOLA BATTISTONE
GODFREY PUSHNIG
BY

*Ely, Golrick & Flynn*
ATTORNEYS

INVENTORS
NICOLA BATTISTONE
GODFREY PUSHNIG
BY
*Ely, Golrich & Flynn*
ATTORNEYS

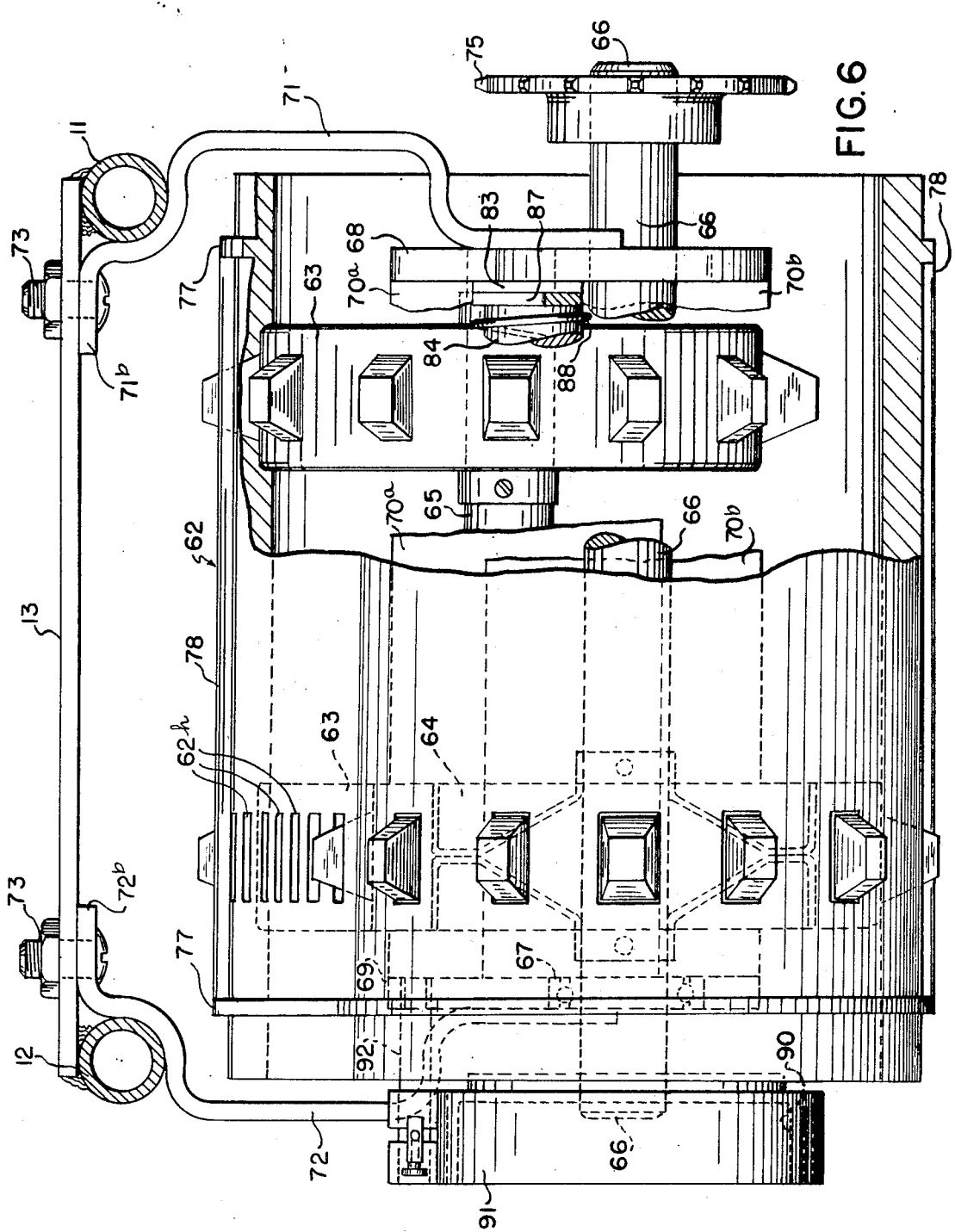

CONVERTIBLE SNOW TRACK-WHEELED SCOOTER TYPE VEHICLE

Various miniature bicycle or motor scooter type wheeled vehicles, also small motor driven snow-mobiles or snow scooters, and as well snow tracking and drivable conversion units attachable to wheeled vehicle frames have appeared both on the market and in the prior patented art. Take-down constructions at least partially dis-assemblable for compact storage and transportation have been included in several of the aforementioned items.

The present invention is generally concerned with a motor scooter type vehicle of such construction that it is readily convertible between forms respectively functional as a motor-driven snow scooter and as a two-wheeled motor scooter.

In the particular embodiment of the invention hereinafter described, there is provided a simple bent tubular primary frame weldment, relatively light in weight though rugged and low cost in construction and having readily removable from and mountable thereto a front steering fork and handle bar assembly including a preferably permanently mounted front vehicle steering wheel. The primary frame supports an appropriate gasoline engine; a selective transmission gear box; a rear drive wheel permanently mounted to the frame and having a permanent chain sprocket drive connection to the gear box, but shiftable between an upwardly retracted inoperable position and a downward operable position by simple selection of frame anchor points for rear wheel shock absorbing struts; and further including, removably attached to the bottom of the front wheel fork assembly and of the frame respectively, a simple front steering runner or ski assembly and an endless belt or caterpillar type snow belt driving assembly readily connected and disconnected with the gear box through a drive sprocket chain.

By relatively simple and expeditious removal of the front ski, and of the snow belt driving assembly with shifting of the rear wheel down into operative position, without more, the vehicle is operable as a two-wheeled motor scooter under usual engine controls with the transmission set for wheel drive. To restore the snow functional form, the runner is re-clamped to the front wheel fork, the rear wheel is simply retracted by shifting the rear wheel shock absorber strut attachment on the frame, and the snow belt driving assembly is bolted onto the bottom of the frame, with its sprocket chain connected to the transmission unit, so that with appropriate transmission selection the snow vehicle functional form is immediately available. Further the rear wheel retractability in conjunction with a removable seat securement by means providing a selective rear wheel strut attachment, the ease of snow driving assembly removal, and a simple front steering fork demountability, facilitate diminishing the bulk of the entire vehicle for ready compact transport.

The structures by which these advantageous functions are achieved are hereinafter described in detail relative to the drawings.

The general object of the present invention is to provide a miniature motor driven vehicle easily converted between a two-wheeled motor scooter type vehicle and a caterpillar or endless belt driven type snow vehicle.

A further object is the provision of a vehicle of the type described which is readily dis-assembled into a relatively compact form for transport.

A further object is the provision in a vehicle of the character described of a comparatively low cost construction which is relatively simple, rugged and durable.

Other objects and advantages will appear from the following description and the drawings wherein:

FIG. 6 is an enlarged rear view of the snow driving belt assembly with portions broken away.

Figure 1:
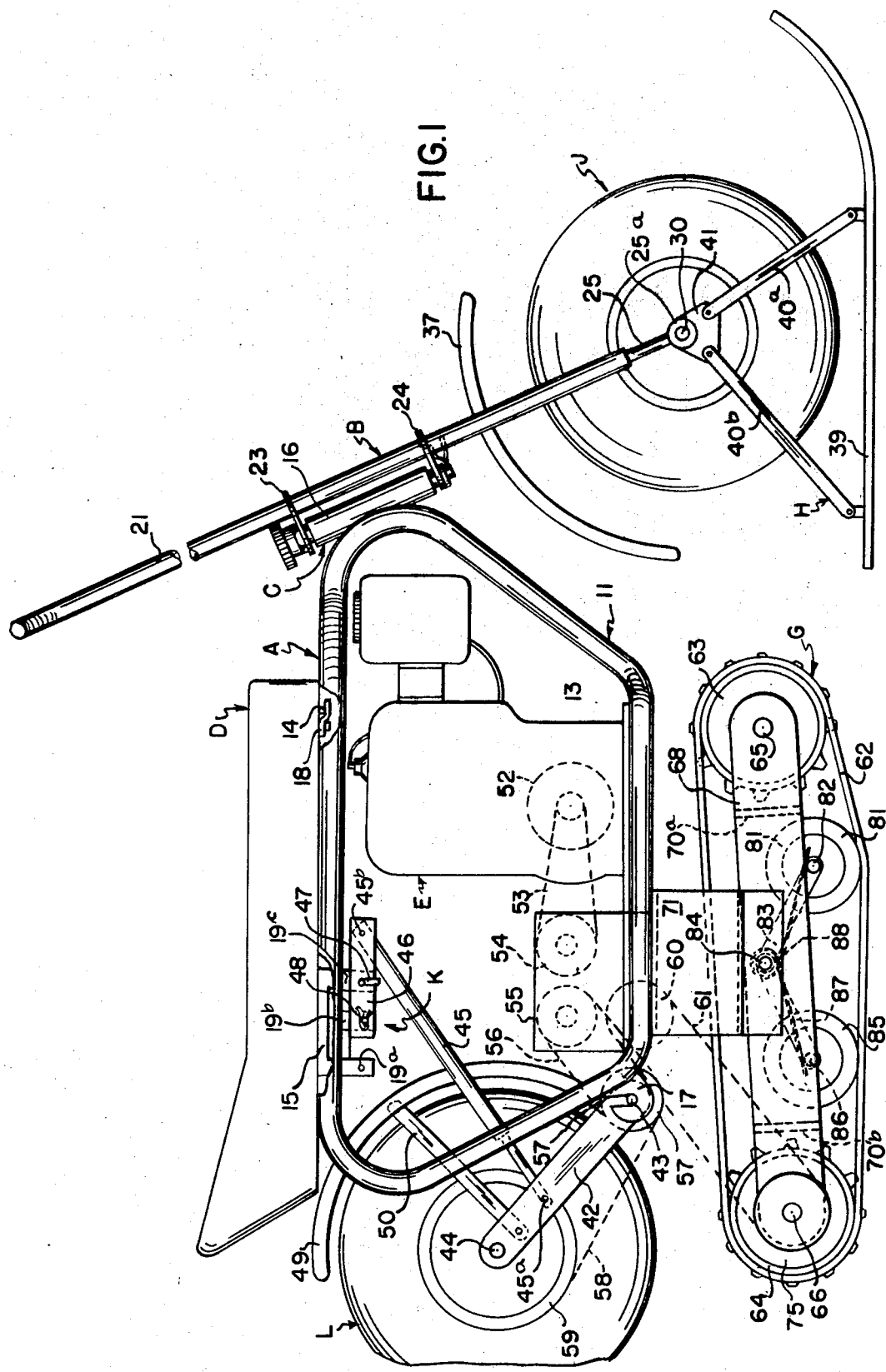
FIG. 1 is a right side elevational view of the vehicle with components disposed in a snow vehicle functional form.

In the specific embodiment of the invention shown by the drawings and herein described, the overall vehicle construction is best seen in FIG. 1, with the components disposed as for a motor driven snow vehicle or snow scooter.

The principle components or sub-assemblies hereinafter described in detail comprise a welded bent tubular type basic vehicle frame A having attached thereto a handle bar and steering fork assembly B readily mountable and demountable by a head post pivot structure C; a seat structure D secured on the top of the primary frame; a small internal combustion engine or motor E and rearward thereof a selective transmission or gear box F, both mounted at the bottom region of the and within the confines of the primary frame; appropriate sprocket chain drive connections between the transmission and the engine and the hereinafter described rear wheel and snow belt drive assemblies; a caterpillar belt or endless belt snow track drive assembly G removably attached to the frame bottom; a front runner or steering ski assembly H removably attached to a steering fork front wheel axle; a preferably permanently attached front steering wheel J at the bottom of fork assembly; and a permanently attached supporting fork and strut assembly K for the rear driving wheel L.

Figure 2:
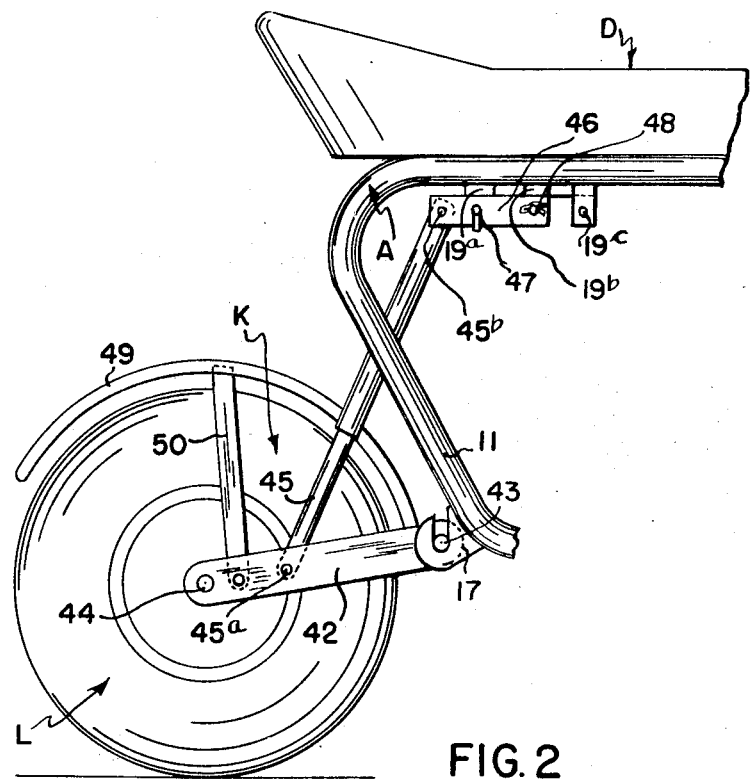
FIG. 2 is a fragmentary right side elevation of the rear portion of the vehicle showing the rear wheel in downward, extended position for wheeled-motor vehicle form.

The snow belt of drive assembly G and the runner of assembly H, of course, provide respective driving and steering snow support contact of the vehicle with the rear vehicle driving wheel secured in the retracted position shown in FIG. 1; but the latter may be disposed and secured in a driving functional position as shown in FIG. 2 for two-wheel bike or motor scooter operation by selective anchoring of the rear struts to the frame A as hereinafter described.

Unless the context indicates otherwise, when a component, assembly or sub-assembly is described as "permanently" mounted or attached relative to another, the intent is not absolute permanence, but rather that the item under discussion need not ordinarily be removed from the frame or the vehicle as a whole, in converting from one vehicle operational mode or form to another.

Obviously, with the rear wheel and sub-assembly K retracted as in FIG. 1, the seat D removed as hereinafter described, the snow drive assembly G and the entire front fork assembly B removed from the frame with or without a preferred separation of the sub-assembly H, the entire vehicle bulk is reducible to a far more compact form quite convenient, for example, for stowing in an auto for transport from one place of use to another.

The frame A comprises as a weldment two generally trapezoidal metal tubular frame elements 11 and 12, right and left hand mirror images of each other; a horizontal transverse motor and mechanism supporting rigid plate 13 (see FIG. 6) welded on top of shorter parallel horizontal bottom reaches, the upper longer horizontal reaches being connected also in like spaced parallel relation over their major length by welded-on front spacer bar 14 and a rear spacer bar or plate 19; and an inclined head post tube 16 welded between the radiused front top corners of the frame members; the rearwardly downwardly sloping front reaches and forward portion of the respective upper reaches accordingly being bent to embrace rear quadrant portions of the tube 16.

The placing of the plate 13 on top of rather than below the lower tube reaches contributes to strength and ruggedness, since the mechanism load is communicated directly to the frame rather than solely through the welds.

Each frame member may be formed by bending steel tubing (with appropriate corner radii as shown) in a plane to a symmetrical trapezoid, bringing the ends together and welding in end-butting relation in the bottom reach; and thereafter bending the front portion out of the plane as required for a respective frame member to provide the forward convergence to head tube 16 with the spacing desired between the planes of the generally parallel residual "flat" portions of the two frame elements. Preferably also concave grooves, mating in curvature with the head tube exterior, are formed in the respective corners of the frame members as seats for the head tube to be welded thereto, affording wider spacing for welds on each side of each such seat groove.

Figure 7:
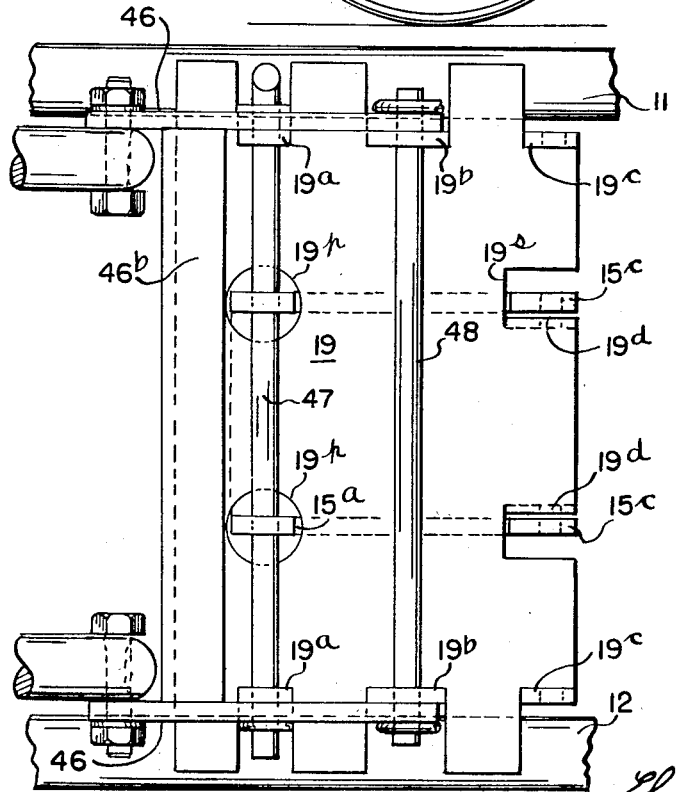
FIG. 7 is a bottom plan view of a seat mounting detail.

The front spacer bar rod 14, and the plate 19 provide points for seat securement. The seat is releasably secured on the top reaches by a clamping plate 18 screw-secured to the front bottom region of the seat to releasably clampingly engage bar 14 between its forwardly projecting tongue and the seat bottom; and (see FIG. 7 with parts disposed for retraction as in FIG. 2) by a pin 47 selectively inserted through the hereinafter-described dependent lug pairs 19a—19a (or 19c—19c) and the respective paired apertured dependent rear ears 15a—15a (or front ears 15c—15c) of a rear securing bracket 15 on the bottom of seat D, to accommodate and laterally locate which latter ears, the plate 19 has rear perforations 19p and front edge slots 19s, the latter formed by striking upwardly the ears 19d as stabilizing the seat against lateral shift. At the lower rear regions of each back reach, the frame members are provided with respective welded-on top edge-slotted bracket plates as shown at 17 for rod means 43 pivotally mounting a fork of the rear wheel supporting structure, and supporting bearings for an intermediate sprocket pair 57 as hereinafter described.

At the rear of the frame and projecting downwardly from the plane of and inward of the upper reaches, there are provided two like parallel sets of three equispaced anchor lug or ear elements 19a, 19b, 19c apertured as anchor formations (see FIG. 7) receiving anchor pins for the seat and rear wheel shock absorber struts to be described; these elements here provided as lateral sets of ears struck downwardly out of the edges of plate 19 welded to the bottom of the upper reaches, or welded to or integral with a welded on plate or channel spanning the upper reaches.

In the front steering fork and handle bar assembly B, two generally parallel elongated tubular elements 21, extending through the end apertures of and welded to spaced like upper and lower triangular plates 23 and 24, have their respective upper ends outwardly oppositely bent to form integral handle bars, resulting in respective elongated inverted L-shapes.

In the lower end of each tube 21 there is telescoped a respective front axle support member 25 as part of a shock absorber structure provided in each by a helical spring having its lower and upper ends threaded onto a correspondingly threaded inner end of the member 25 and similarly threaded lower end of a plug pin-secured within the tube 21. The lower end of each telescoped strut element 25 has a front wheel shaft receiving eye 25a, e.g., provided by a short welded-on sleeve. The front wheel J is then supported on a shaft 30, passed through eyes 25a and an appropriate bearing structure contained in the wheel hub; for example, by a shaft bolt having a nut appropriately secured thereon by cotter pins or other safetying means. A fender 37 is secured between the tubes 21—21, being either welded at each edge to such struts or preferably secured on a transverse spacer welded therebetween.

The steering fork mounting structure C includes a manually removable lockable pivot pin 32 passed through central rear apertures in fork plates 23–24, and through appropriate bearing means secured in head tube 16 received between the fork plates; pin 32 releasably secured at its projecting bottom end by a bayonet pin-and-slot locking arrangement, generally designated 33, located on the bottom face of plate 24. Pivot pin 32 includes a knurled hand grip head 32a, integral with or, as here shown, threaded onto the top end of a pin shank or shaft 32b and secured by a jam nut 32c; the pin shaft portion traversing the head tube length through a bearing sleeve received in the inner races 34, 35 of upper or and lower ball bearing or like units having outer races pressed into or in other apt manner held in suitable socket formations at the upper and lower ends of the head tube.

To receive a short bayonet stud or pin 33p, projecting radially inwardly into the bore of a collar 33c providing a continuation of the aperture in and welded to the lower plate 24, the lower end of the shaft 34b is provided with a square-sectioned semi-circumferential slot or groove 32g at one end terminating in a correspondingly shaped stud entrance slot 32s running out the projecting shaft end. Pin 32 is retained thereby upon rotation through a half turn, bringing the bayonet stud into the location diametrically opposite to the entrance slot 32s. Diametrically opposite the location of stud 33p, on the bottom of plate 24 at a central location between the tubes 21, there is spot-welded one leg or broad flat leaf of a folded spring element 36 narrowing at its bent portion into a tongue 36t engaged in slot 32s when the pivot pin is positioned for locking, and having a second leaf or spring finger 36f reflected forwardly into the protected region between the two tubular elements 21, 21.

Figure 3:
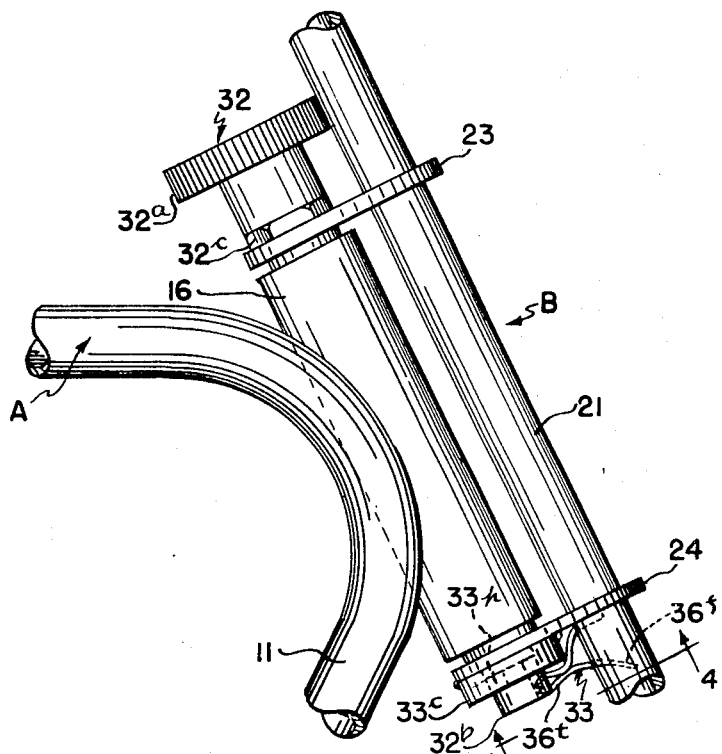
FIG. 3 is a right side fragmentary elevational view showing in greater detail a demountable pivotal connection between the steering fork and main frame.
Figure 5:
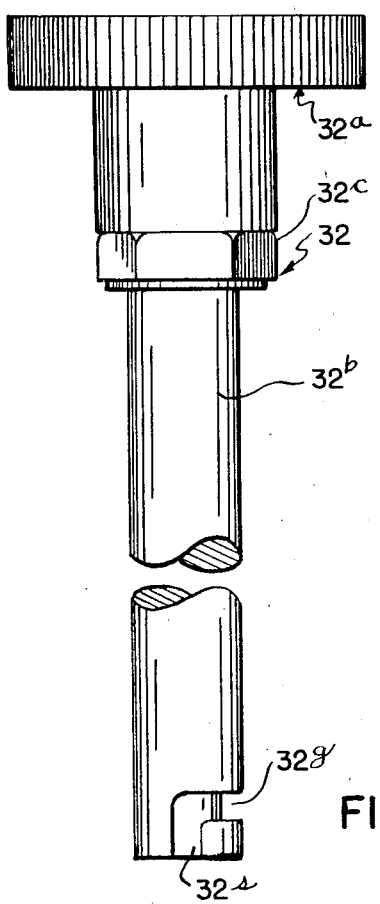
FIG. 5 is a detail of a pivot bolt used in the structure of FIG. 3.
Figure 4:
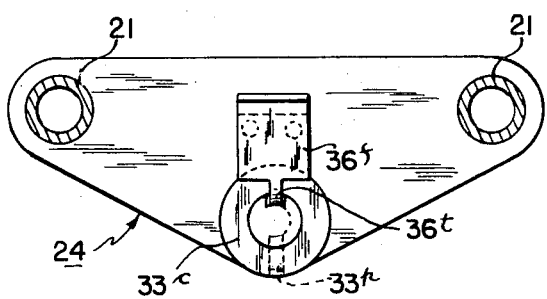
FIG. 4 is a detailed view taken as indicated by the line 4—4 in FIG. 3.

Thus the steering fork assembly may be demounted from the condition shown in FIGS. 1 and 3 by finger pressure on the spring operating arm 36f lifting tongue 36t out of slot 32s, rotating the then freed pivot pin 32 clockwise through a half turn to bring the slot 33s into coincidence with stud 33p, and then withdrawing the entire pin to free the fork from the head tube. Upon remounting by a reverse sequence of operations, the spring lock, displaced by the shaft end, snaps into slot 32s upon final rotation of 32 without specific manipulation of the spring.

The front runner assembly H comprises merely an appropriately stamped and formed sheet metal ski-like runner element 39; and, in a spaced parallel relation on either side of the wheel location, a respective mounting strut structure, each formed, in a triangular truss unit, by front and rear struts 40a, 40b with lower ends secured, as by riveting or welding to respective upwardly projecting lugs welded on or integrally struck up from the ski element 39 and upper ends similarly rigidly secured to a triangular plate 41. Each plate 41, near its upper apex, in preference to a hole, has an inward slot, whereby, with the nut of shaft bolt 30 loosened, the plates may be slid over or off the shaft 30, where clamped between the inner end of a respective eye 25a and the end an inner bearing race or sleeve in the hub of the wheel J. Thus the assembly H is easily mounted, and then secured by appropriately tightening the nut on the shaft when the plates 41 are in position; and quickly demounted by nut loosening, assembly withdrawal and nut retightening.

In the shiftable rear wheel fork and supporting assembly K, the rear fork 42 may be a rigid generally elongated U-shaped heavy metal form or weldment pivotally supported by a shaft 43 through its forward yoke portion, between the aforementioned mounting brackets 17; the wheel L being mounted between the rearwardly extending parallel fork spaced arms by an appropriate axle 44 secured by apt means. On each side of the wheel, the lower ends of similar shock absorber strut units 45 are permanently pivotally secured as shown at 45a to respective arms of fork 42.

The strut upper ends are pivoted at 45b to the outer ends of respective anchoring plate arms 46 yoked by an end welded angle section 46b and having apertured inner ends pivoted on the pivot pin 48 through the anchor lug pair 19b—19b, and have intermediate apertures spaced from the inner pivot apertures corresponding to the like spacing between the apertured anchor lug pairs 19a-19b, 19b-19c for selective securement (at either of the two positions represented by FIG. 1 and by FIG. 2) by locking pin 47 passed through both plates 46 and the selected pairs of anchor lugs; both pins safetied by cotter pins. A rear fender 49 is appropriately secured at its front end in the yoke region of the fork 42 and also by the U-shaped support strap 59 to the fork arms. The spacing of the apertured anchor lugs is such that anchoring on 19a, 19b places the rear wheel in downwardly, rearwardly extended operative drive position.

With the bases of the transmission box F and of the engine E secured at rearward and fixed forward positions on plate 13, permanently available driving connections are provided by a chain 53 from the sprocketed output side of a centrifugual clutch 52 on the engine shaft to the transmission input sprocket 54; and through a wheel drive transmission output sprocket 55 and chain 56 to the left one of two intermediate sprockets 57 secured on shaft 43 which serves as a pivot pin for the rear fork; the right one of the intermediate sprockets being connected by the wheel drive chain 58 to the rear wheel sprocket 59. This arrangement permits swinging the rear wheel from retracted position of FIG. 1 to the functional position of FIG. 2 without affecting the drive arrangement which is therefore at all times ready for use without adjustment upon setting of a transmission output selector. For the snow drive assembly G, the transmission F in addition to providing a high and low gear ratio selection, further provides selection of the output drive as between the wheel drive sprocket 55 and a second snow drive output sprocket 60 for a drive chain 61 for the snow belt drive unit G.

In the snow drive assembly G (see FIG. 6), a wide, heavy, fabric or wire reinforced flexible rubber drive belt 62 is primarily supported on front and rear pairs of sprockets 63—63, 64—64 fixed in spaced relation on respective front and rear shafts 65–66 having opposite ends rotatably supported through appropriate ball bearing units in the two longitudinally extending, parallel, elongated right and left sub-assembly frame or plate members 68 and 69, rigidly spaced and secured in a frame by transverse spacer plates 70; the outwardly projecting right end of shaft 66 carrying the chain drive sprocket 75 engaged by chain 61. The spacer plates 70, spaced inwardly beyond the tooth swing of the respective front and rear sprockets, form a rigid basic frame weldment with the longitudinal plate 68–69, in conjunction with the mounting brackets 71, 72.

To the upper central outer face of each plate member, located inwardly of a respective belt margin, there is welded the lower end of a respective formed heavy metal mounting bracket plate 71, 72 extending upwardly with an outward offset to provide clearance around the belt margin and having its upper end reflected inwardly to run in under and upwardly along a lower straight reach portion of a respective frame element 11 or 12, to terminate in an inwardly bent end portion 71b (or 72b) bolted to the bottom of the plate 13 of the primary frame at a plurality of appropriately spaced locations for bolt and nut connections as indicated at 73. The quarter-circumferential embracing of each frame tube by the respective bracket end, the upward or reaction thrust of the brackets being taken by the lower frame tube reaches rather than solely by plate 13, as well as much of the side thrusts, contributes greatly to the strength of the structure as well as security of the mounting. The apertures in either or both of plate 13 and the terminal portion 71b and 72b are appropriately slotted for slight longitudinal tension adjustment of the drive chain 61.

Spaced inwardly from each side margin, the belt is provided with a respective circumferential set of equally spaced sprocket apertures 62h, in each of which sets engage the teeth of a respective corresponding front and rear lateral sprocket pair 63—63. The outer belt surface, outward of each sprocket hole series, has a continuous longitudinally extending integral, square cross-section rib 77 (on a 10 inch wide belt, about ¼in. × ¼in. in section and spaced about three-fourth inch to one inch in from the edge), and transversely extending ribs 78 (on a except top and bottom position ribs 78 being omitted in FIG. 6, to avoid obscuring other structure) of similar section running between the longitudinal ribs 77, 77 at about 2 inch parallel spacing.

It should be noted that the plane of the shafts 65–66, is inclined forwardly upwardly toward the plane of the lower frame reaches to provide what might be called a "snow-climb angle" particularly at the front of the belt with the backup next described. To give backup support to the lower snow-contacting or bearing belt reach, in the frame of assembly G there is mounted a backup idler wheel sub-assembly comprised of forward and rear sets of three and two wheels or rollers 81, 85 rotatably mounted in axially spaced relation on shafts 82, 86 carried at the lower ends of spaced, parallel support arm pairs 83, 87 having upper ends pivoting on a common shaft 84 fixed between the longitudinal frame plates 68, 69 (see FIG. 1; these elements being omitted from FIG. 6 for clarity of other representations.) The wheels or rollers of the two sets are in staggered or alternating spaced relation to each other, and all are pressed downwardly against the inner surface of the lower belt reach by bias means such as one or more helical springs 88 with coil portions disposed coaxially on the shaft 84 and having respective end turns terminating in straight outwardly extending arms bearing upon the shafts 82 and 86 respectively to urge them toward the belt.

In the snow drive assembly, there further is optionally provided braking means including a braking drum 90 secured on the projecting left end of the shaft 66; a self-biased or spring released split brake band 91 having an appropriate internal friction show surface, and secured relative to the frame by an anchor pin or stud 92 threaded into the frame plate 69; the brake being actuated by an appropriate flexible cable (not shown) extending from the band to an appropriate actuating lever on the frame.

Being not per se part of the invention, other conventional aspects of motor control, wheel braking if desired, and the like are not shown nor here described; nor are controls for transmission shifting and drive sprocket selection nor of the transmission unit, as these may comprise any of several known arrangements. However, it is observed that a preferred type of internal combustion engine for present use would be one of those commercially available having a centrifugal clutch engaging at say 2000 r.p.m. of the shaft.

From the aforegoing description, the mode of conversion between the two functional arrangements should be obvious as being simple and expeditious. To convert from the snow vehicle arrangement of FIG. 1 to a two wheel bike arrangement, no more is necessary than: loosening the front wheel shaft bolt 30 to unclamp the plate portions 41 allowing the entire ski assembly H to drop away, and retightening the shaft bolt; unbolting the few bolts 73 and removing chain 61 to demount snow drive assembly G; removing the safetied anchoring pin 47 from lugs 19c to permit the rear wheel support assembly K to pivot downwardly into operating position, with anchor plates 46 swung through 180° about pin 48 as a pivot to align their apertures with the apertures of rear lugs 19a, replacing the pin 47 now through the anchor plates lugs 19a and back seat lugs 15a, and safetying the same. With this the vehicle is then immediately ready for operation as a wheeled motor scooter with appropriate transmission settings. The reconversion to the snow vehicle form again is obviously simply carried out by reverse sequence of such operations, including required tightening of belt 61 as permitted by the slots engaged by bolts 73.

Further it is observed that the seat D is quickly removed by loosening the clamping screw-secured front clamp plate means 18, unsaftying and withdrawing the L-shaped pin 47, allowing the seat to be pivoted upwardly about the rod 14 to clear the ears 15a and 15c from plate 19, and drawing the seat rearwardly to free it from 14, and thereafter securing the yoked plates 46 in forward position on lugs 19c by pin 47 thereupon safetied. The front fork is readily disassembled merely by pressing latch spring 36 and turning pivot 32; and the snow track assembly G is easily removed as above described. Thus the vehicle is quickly prepared for more ready storage in automobile transport from one place of use to another in relatively compact form, with the retraction of the rear wheel assembly into the position of a snow vehicle form (FIG. 1) and seat removal further reducing the overall dimensions or space required.

Also it is to be observed that the generally symmetrical form of each of the frame members 11, 12 particularly before the bending or forming of the forward portions facilitates manufacture and decrease cost, since the same are identical in fabrication up to the point where the forward ends are bent out of the original plane of formation; and further with the engine and mechanism supporting plate welded into position on the top of the lower reaches and the spacer bars 14, 15 between the upper reaches welded in position coplanar with the top edges of the reaches conduces to a simple and yet more rugged durable, light weight overall frame structure.

We claim:

1. A motor-scooter type vehicle capable of ready conversion between forms functional respectively as a two-wheeled vehicle and a belt driven snow vehicle, comprising:
   a unitary frame
   including right and left side tubular frame elements formed to closed shapes having upper reaches secured to each other by welded-on transverse upper spacer means and lower reaches secured to each other by welded-on lower spacer means, and further including a front head tube welded between forward portions of said elements;
   said frame open at the rear to afford retractable rear-wheel receiving space;
   a steering fork assembly demountably pivotally secured in said head tube
   and including a front wheel rotatably supported on an axle through the lower arm ends of said fork assembly;
   an internal combustion engine and a selectable transmission box taking the power output of the engine and mounted on the lower spacer means within said frame, said box having at least one output sprocket;
   a rear wheel supporting fork assembly including
   a rear fork having a forward portion connected to the rear portions of said frame elements to pivot about a transverse axis and providing rearwardly extending arms with a rear wheel axle-supported therebetween,
   shock absorber strut means having
   a pivoted lower end connection to said rear fork proximate to a rear wheel axle, and a shiftable upper end connection to the rear upper portion of said frame, whereby the upper end connection selectively is made at two distinct points for securing said rear wheel in an upwardly retracted non-functioning position and in a rearwardly downwardly shifted operative position respectively,
   a dual intermediate sprocket mounted to the frame for rotation about the said transverse pivot axis, a sprocket chain between said output and intermediate sprockets,
   a driven sprocket on the rear wheel and a second sprocket chain between the driven and intermediate sprockets, whereby a drive connection is maintained between said output sprocket and the rear wheel throughout shifting of said rear wheel;
   a belt-type snow traction assembly including
   an assembly frame demountably secured to the bottom of the said unitary frame,
   front and rear belt sprocket means rotatably supported by the assembly frame,
   one of the last said means sprocket-chain-driven from an output sprocket of said transmission box,
   and an endless snow traction belt supported on said front and rear sprockets means and having sprocket holes tracking on the sprocket means;
   a steering runner assembly detachably secured to the lower end of the steering fork assembly; and
   seat means supported on the top region of said frame.

2. A vehicle as described in claim 1, wherein said transmission has two output sprockets selectably operated for vehicle drive respectively through a sprocket chain to said snow traction assembly with said rear wheel retracted and through said intermediate sprocket to said wheel for wheel vehicle operation when the rear wheel supporting assembly is swung downward to operative position with said traction and runner assemblies removed.

3. A vehicle as described in claim 1, wherein said snow traction assembly comprises two parallel longitudinal frame members secured in rigidly spaced relation by front and rear transverse spacers located respectively inward from front and rear ends to constitute the said assembly frame;
two shafts for said sprocket means respectively located forwardly and rearwardly of said spacers, and having opposite ends rotatably supported in said longitudinal frame members;
said sprocket means each comprising a like pair of sprocket wheels on a respective one of said shafts, the sprocket wheels disposed aligned in lateral pairs, and
said belt having two series of sprocket holes, each series tracking on a respective said lateral pair;
downwardly spring-biased backup roller means supported in the assembly frame between said spacers to bear upon the inner side of the snow-contacting lower reach of said belt; and
bracket means extending upwardly from each longitudinal member and terminating in an upper end formation bolted to the bottom of said vehicle frame.

4. A vehicle as described in claim 3, wherein
each said upper end formation curls inwardly under and then vertically upward about a respective tubular frame element lower reach, and is then reflected inwardly under a portion of said lower spacer means;
each said formation having a bolt-and-slot connection to said lower spacer means providing the demountable securement of the snow traction assembly to the frame with a limited longitudinal adjustability on the frame for tensioning of a removable sprocket chain providing the drive connection from the transmission box to the traction assembly.

5. A vehicle as described in claim 3 with said back up roller means comprising:
a transverse shaft extending between and supported by said longitudinal frame members near the middle region thereof;
respective forward and rear shafts swingably supported by arm means on and in parallel relation to said transverse shaft,
respective pluralities of rollers rotatably carried by the forward and rear shafts and engaging the inner side of the snow contacting belt bottom reach, and a helical spring helically disposed about the transverse shaft and having respective spring end arms bearing downwardly on the forward and rear shafts.

6. The vehicle as described in claim 1 wherein said steering fork assembly includes
two parallel plates and two elongated members passing through aligned lateral apertures of and welded to the plates to extend downwardly as the fork arms held in spaced parallel relation,
rearwardly extending portions of said plates having aligned apertures and spaced to receive therebetween said head tube aligned with the last said apertures,
a short pin extending radially forwardly in the lower plate aperture and a spring finger extending rearwardly beyond the forward side of the aperture and secured on the lower plate diametrically opposite to but downwardly off-set from said pin, a removable pivot bolt having a shank extending through said plates and head tube to provide a steering pivot mounting of the fork to the vehicle frame with the lower shank end projecting below the lower plate,
said lower end having an axial pin entrance end slot running from the extreme shank end inward to one end of a semi-circumferentially extending groove at the level of and adapted in cross section to accommodate said pin, whereby upon insertion the pivot bolt receives said pin into said groove and by a bolt half-turn the spring finger engages in said end slot to lock the pivot bolt in a certain pin-retained position, and with bolt removal by manual spring disengagement and half-turn belt rotation and withdrawal, the fork is dismountable from the frame.

7. A vehicle as described in claim 1, wherein said shiftable upper end connection of the rear wheel supporting fork assembly comprises two like longitudinal sets of three dependent apertured anchoring lugs with equi-spaced apertures, each set proximate to a respective upper reach of the frame elements, the corresponding lugs of the sets forming front, middle and rear aperture-aligned pairs, a swingable bracket including side arms having apertured inner ends pivotally secured to the said middle pair of lugs, outer ends pivotally secured to the upper end of said shock absorber strut means, and respective locking apertures spaced from the inner end pivot axis corresponding to the spacing between the front and rear pair lug apertures from the middle lug pair apertures, a releasable securing bracket pin through the said locking apertures and selectively through the front or rear lug pair apertures and thereby selecting the point of strut means connection in a forward position for rear wheel retraction, or in a rearward position for rear wheel operative positioning.

8. A vehicle as described in claim 7, wherein said upper spacer means of the vehicle frame includes a forward spacer bar welded between the upper reaches and a rear spacer plate, said rear spacer plate having portions along each side downwardly struck to form respective said lug sets, the residual plate margins welded to the rear bottom regions of the respective upper reaches.

9. A vehicle as described in claim 8, wherein an elongated seat is supported on said upper reaches and is secured near its front and rear to said forward spacer bar and rear spacer plate respectively;

and including means for seat securement to the bar comprising a downwardly offset clamping tongue projecting forwardly under the bar permitting at least limited upward tilting from the rear about the bar, and a bracket secured to the rear seat bottom region having apertured front and rear pairs of transversely spaced apertured lugs projecting downwardly through and below the rear spacer plate plane with apertures in alignment respectively with the apertures of the front and rear anchoring lug pairs, whereby said seat is secured on the frame by said releasable securing pin when the rear fork assembly is secured in either of its selectable positions, and the seat is released for removal upon withdrawing of said securing pin.

10. A motor-scooter type vehicle comprising:

a unitary frame including right and left side tubular frame elements formed to closed shapes having upper reaches secured to each other by welded-on transverse upper spacer means and lower reaches secured to each other by welded-on lower spacer means, and further including a front head tube welded between forward portions of said elements;

said frame open at the rear to afford retractable rear-wheel receiving space;

a steering fork assembly pivotally secured in said head tube;

an internal combustion engine and a selectable transmission box taking the power output of the engine and mounted on the lower spacer means within said frame, said box having at least one output shaft;

a rear wheel supporting fork assembly including a rear fork having a forward portion connected to the rear portions of said frame elements to pivot about a transverse axis and providing rearwardly extending arms with a rear wheel axle-supported therebetween, shock absorber strut means having a pivoted lower end connection to said rear fork proximate to a rear wheel axle, and a shiftable upper end connection to the rear upper portion of said frame, whereby the upper end connection selectively is made at two distinct points for securing said rear wheel in an upwardly retracted non-functioning position and in a rearwardly downwardly shifted operative position respectively, and drives means including an intermediate sprocket mounted to the frame for rotation about said transverse pivot axis, means drivingly connecting said output shaft to said intermediate sprocket, a driven sprocket on the rear wheel and a sprocket chain between the driven and intermediate sprockets, whereby a drive connection is maintained between said output sprocket and the rear wheel throughout shifting of said rear wheel.

11. A motor-scooter type vehicle as described in claim 10 having:

said upper spacer means of the frame including a forward spacer bar between the upper reaches and a rear spacer plate;

said shiftable upper end connection comprising, three longitudinal equi-spaced dependent apertured anchoring lug means on said rear spacer plate forming front, middle and rear anchoring lug means, a swingable bracket with an inner end secured by a pivot pin through the said middle anchoring means, transversely spaced outer end portions coaxially pivotally secured to the respective upper ends of said shock absorber strut means, and having a locking aperture spaced from the inner end-securing pivot pin correspondingly to the spacing of the apertures, of the front and rear anchoring lug means, from the middle lug means aperture, and a releasable securing pin through the said locking aperture selectively securing the bracket to the front anchoring lug means and thereby the point of strut means connection in a forward position for rear wheel retraction, and to the rear anchoring lug means and thereby said point of connection in a rearward position for rear wheel operative positioning.

12. A vehicle as described in claim 11, wherein said seat means is an elongated seat supported on said upper reaches and is secured near its front and rear to said forward spacer bar and rear spacer plate respectively;

the seat securement to the bar comprising a downwardly offset clamping tongue projecting forwardly under the bar and permitting at least limited upward tilting from the rear about the bar, and a bracket secured to the rear seat bottom region having apertured spaced front and rear transversely apertured lugs projecting downwardly through and below the rear spacer plate with apertures in alignment respectively with the apertures of the front and rear anchoring lug means, whereby said seat is secured on the frame by said releasable securing pin when the rear fork assembly is secured in either of its selectable positions, and the seat is released for removal upon withdrawing of said securing pin.

13. In a motor-scooter type vehicle having a frame including a head tube and a steering fork assembly demountably pivotally secured in said head tube, the combination comprising:

said steering fork assembly including two parallel plates and two elongated members, said elongated members passing through aligned lateral apertures of and welded to the plates to extend downwardly as the fork arms held in spaced parallel relation, rearwardly extending portions of said plates having aligned apertures and being spaced to receive therebetween said head tube aligned with the last said apertures, and a short pin extending radially forwardly inward in the lower plate aperture and a spring finger extending rearwardly beyond the forward side of the aperture and secured on the lower plate diametrically opposite to but downwardly offset from said pin, a removable pivot bolt having a shank extending through said plates and head tube to provide a steering pivot mounting of the fork to the vehicle frame with the lower end projecting below the lower plate, said lower end having an axial pin-entrance end slot running from the extreme shank end inward to one end of a semi-circumferentially extending groove at the level of and adapted in cross section to accommodate said pin, whereby upon insertion the pivot bolt receives said pin into said groove and by a bolt half-turn the spring finger engages in said end slot to lock the pivot bolt in a certain pin-retained position, and with bolt removal by manual spring disengagement and half-turn belt rotation and withdrawal, the fork is dismountable from said frame.

14. A motor-scooter type vehicle functional as a traction belt driven vehicle, comprising:

a unitary vehicle frame including right and left side tubular frame elements formed as mirror images of each other and providing spaced respective upper tubular reaches, each said tubular frame element curving from its upper reach at the rear downwardly into a descending rear portion and at the front downwardly into a descending forward portion, the descending rear and forward portions of the tubular elements having respective bottom portions in a common plane, a front head tube welded between said forward portions of said elements, and transverse means welded to said bottom portions maintaining them in spaced relation and with said tubular elements and front head tube comprising a vehicle frame main weldment, said frame further providing a plate portion extending fore and aft generally parallel to said plane and rigidly secured with the said bottom portions of the tubular elements to afford an engine-mounting base;

a steering assembly including a steering fork pivotally secured in said head tube and a vehicle support surface contacting steering element on the bottom of the steering fork;

an internal combustion engine and a transmission unit taking the power output of the engine mounted on said plate portion within said vehicle frame, said unit having an output wheel;

a belt-type traction drive comprising a drive frame rigidly secured to the bottom of the said frame weldment, front and rear sprocket means rotatably supported by the drive frame, one of the last said means driven from said output wheel of said transmission unit, and an endless traction belt supported on said front and rear sprocket means to extend longitudinally forwardly under a major portion of the vehicle frame length and having sprocket holes tracking on the sprocket means; and seat means supported on said vehicle frame.

15. A vehicle as described in claim 14, with said front sprocket means disposed in the region of and lower than the bottom portions of the descending front portions of the tubular elements and said rear sprocket means disposed lower than and in the region of the bottom portions of the descending rear portions of said tubular elements.

16. A vehicle as described in claim 14, wherein said traction drive includes two parallel longitudinal frame side plates secured in rigidly spaced relation;

front and rear shafts for said sprocket means respectively located between the forward and rearward ends of, and having opposite ends rotatably supported in, said frame side plates;

said sprocket means comprising at least one front and one rear sprocket wheel on respective said shafts, the lower side of the front sprocket wheel being located above the level of a plane including the vehicle support surface contacting portion of said steering element and the lower side of the rear sprocket wheel, respective sprocket teeth sets of the said wheels being disposed in a common plane, and said belt having a series of sprocket holes tracking on said sprocket teeth; and backup roller means supported in the drive frame intermediate said shafts and downwardly spring-biased to bear upon the inner side of a vehicle support surface contacting lower reach of said belt between said sprocket wheels and thereby maintain a front portion of said lower reach of the belt inclined forwardly and upwardly toward the front sprocket wheel.

17. A vehicle as described in claim 14, wherein said steering element is changeable to provide a ski type runner or a wheel as the steering element for the vehicle.

* * * * *